(12) United States Patent
Plate

(10) Patent No.: US 7,437,355 B2
(45) Date of Patent: Oct. 14, 2008

(54) METHOD AND SYSTEM FOR PARALLEL UPDATE OF DATABASE

(75) Inventor: Klaus Plate, Wiesloch (DE)

(73) Assignee: SAP AG, Walldorf (DE)

( * ) Notice: Subject to any disclaimer, the term of this patent is extended or adjusted under 35 U.S.C. 154(b) by 477 days.

(21) Appl. No.: 10/874,171

(22) Filed: Jun. 24, 2004

(65) Prior Publication Data
US 2005/0289094 A1    Dec. 29, 2005

(51) Int. Cl.
G06F 7/00    (2006.01)
(52) U.S. Cl. .................. 707/3; 707/100; 707/200; 715/763
(58) Field of Classification Search ......... 707/200–201, 707/3, 8, 101–102; 710/200; 715/763
See application file for complete search history.

(56) References Cited

U.S. PATENT DOCUMENTS

| | | | |
|---|---|---|---|
| 5,664,129 A * | 9/1997 | Futatsugi et al. ............. | 715/763 |
| 6,457,021 B1 * | 9/2002 | Berkowitz et al. ........... | 707/201 |
| 6,714,948 B1 * | 3/2004 | Richards ...................... | 707/200 |
| 7,047,337 B2 * | 5/2006 | Armstrong et al. ........... | 710/200 |
| 7,093,761 B2 * | 8/2006 | Smith et al. ............. | 235/462.07 |
| 2004/0010502 A1 * | 1/2004 | Bomfim et al. .............. | 707/100 |
| 2005/0125406 A1 * | 6/2005 | Cina ............................ | 707/8 |

* cited by examiner

*Primary Examiner*—Sathyanarayan Pannala
(74) *Attorney, Agent, or Firm*—Kenyon & Kenyon LLP

(57) ABSTRACT

Methods and systems for performing database updates by parallel processes are presented. In one embodiment, a method may include assigning identifiers to a plurality of processes, wherein the identifiers are selected from a predefined set of identifiers, where no two processes running in parallel use the same identifier. The method may further include receiving a first request from a first process, having assigned thereto a first identifier, to update a first record in a set of records stored in a database, determining if the first record is associated with the first identifier in the database; and updating the first record if the first record is associated with the first identifier in the database. A system in accordance with an embodiment of the invention may include a processor and a memory, the memory including a set of instructions to be executed by the processor to perform a method described herein.

7 Claims, 4 Drawing Sheets

METHOD AND SYSTEM FOR PARALLEL UPDATE OF DATABASE

BACKGROUND

1. Field of the Invention

Embodiments of the present invention generally relate to computers. More particularly, embodiments relate to methods and systems for parallel updates of computer databases.

2. Background of the Invention

It is generally known that data may be stored in a tabular form. Conceptually, tables are comprised of multiple records. In a two-dimensional table, each record is associated with one row. Each row may comprise one or more cells. Columns in the table each represent a specific field with the same meaning for all records. As used herein, tables are equivalent to database tables and accordingly, rows may be referred to alternatively as "rows" or "records," or "database records." Columns may be referred to alternatively as "columns" or "fields." For purposes of description herein, a first row in a table is called a "header row." The cells of the header row may contain a description or identification of the content of the cells below it.

FIG. 1 is a prior art table 100 illustrating a first column 102 having a header cell 104 identified as "Cost Center" and a second column 106 having a header cell 108 identified as "Amount." The table 100 illustrates n records, where n is any positive nonzero integer.

The data stored in tables may be provided as input to numerous reports. Some reports, for example, may summarize the data stored in the many fields in a table. The reports may be useful for such things as tracking the objectives of a business or the availability of commodities. Examples of business objectives may include the total amount of costs attributed to a cost center in a certain month or over a certain period, the amount spent on servicing multiple accounts, or the year to date income from all sources to a cost center. Examples of availability of a commodity may include the number of toy rockets available for purchase from all stores in a nationwide chain of stores. These examples are meant to be illustrative and not limiting.

Generally, and for purposes of description herein, data in a table may be accessed either by an individual process or by a mass process. An individual process may be a dialog session in which an individual user gains access to the table for purposes that may include generating reports or updating the table. For example, the user may have an invoice verification application where the user may post an invoice for a given cost center. Such an application will typically require the entry of cost center identification information and invoice amount into a dialog box on a computer interface unit, such as a keyboard and video terminal. The entry will result in a change in value of a cell of a record, associated with the cost center. A mass process, on the other hand, may be exemplified as a background process run for a multitude of entries. For example, a mass process may post debit memos to the table for all customers. In mass processes, one may receive the information via an electronic file. This file may be processed in the background. In fact, more than one file may be received and may run in parallel. Each file in a mass process file may contain several hundred or several thousand postings for execution.

It is conceivable that mass processes running in parallel may be accomplishing the same task (e.g., posting invoices or payments in parallel). In one example, when a first process accesses the table to change a specific record in the table, the first process may be given exclusive control of the specific record; other processes will not be able to edit the specific record while it is under the exclusive control of the first process. Only after the first process has relinquished its exclusive control of the record will other processes be able to again edit this record. In a system used by more than one user or accessed by more than one process, the ability of multiple users or processes to gain access to any given record is problematic and may cause a bottleneck if the multiple users or processes attempt to access or use the same record contemporaneously. A typical solution may involve a database administration system, which may form a single queue for the multiple parallel processes, where each of the multiple parallel processes waits in the queue for its turn to serially update (e.g., sum or input data to) the subject record.

BRIEF DESCRIPTION OF THE DRAWINGS

The various advantages of embodiments of the present invention will become apparent to one skilled in the art by reading the following specification and appended claims, and by referencing the following drawings.

BRIEF SUMMARY OF THE INVENTION

In an embodiment, the invention provides for methods, systems, and computer readable storage medium for performing database updates by parallel processes. In an embodiment, the invention provides for a method for assigning identifiers to a plurality of processes, wherein the identifiers are selected from a predefined set of identifiers, and where no two processes running in parallel use the same identifier. In an embodiment, the invention provides for receiving a first request from a first process, having assigned thereto a first identifier, for updating a first record in a set of records stored in a database; determining if the first record is associated with the first identifier in the database; and updating the first record if the first record is associated with the first identifier in the database.

DETAILED DESCRIPTION

The problem of multiple parallel users or processes being excluded from simultaneous access to a given record in a table may be solved by adding a field to the table and by modifying an overall process control to account for the added field. One method of changing the design of the table, in accordance with an embodiment of the invention herein, may be to add a field to a table to demarcate individual records for use only by a given process. Such a field may be referred to herein as a process identification ("PROCESS ID") field. The process identification field may allow a plurality of processes to operate on separate records while serving to prohibit various parallel processes from updating the same record. Furthermore, in accordance with an embodiment of the invention disclosed herein, a process may dynamically update the table by adding another row to the table if a row did not previously exist that could be demarcated for use by the process.

Figure 2:
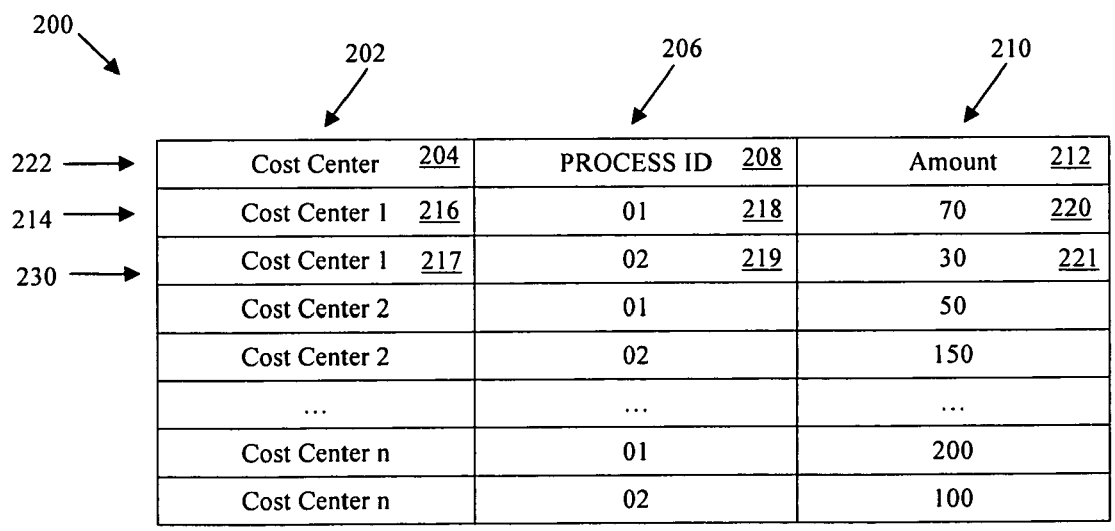
FIG. 2 is an illustration of an expanded table including a unique process identification field in accordance with an embodiment of the invention.

FIG. 2 is an illustration of an expanded table 200 including a PROCESS ID field 206 in accordance with an embodiment of the invention. Expanded table 200 illustrates a first column 202 having a header cell 204 identified as "Cost Center," a second column 206, (i.e., the process identification field 206) having a header cell 208 identified as "PROCESS ID," and a third column 210 having a header cell 212 identified as "Amount." It is noted that while the expanded table 200 is conceptually understood to comprise multiple adjacent records, a memory used by a processor in a computer does not need to store the data that populates the adjacent records in adjacent memory locations. In one embodiment, however, it is preferable to store the data that populates the adjacent records in adjacent memory locations in order to reduce search time for adjacent records. FIG. 2 also illustrates that a first record may comprise a set of cells 216, 218, 220 and that a second record may comprise a set of cells 217, 219, 221. The cells 216, 218, 220, may each be associated with one another by virtue of their being arranged in a row, such as the first row 214 below the header row 222 in FIG. 2. Likewise, the cells 217, 219, 221, may each be associated with one another by virtue of their being arranged in a row, such as the second row 230 below the header row 222 in FIG. 2.

Figure 1:
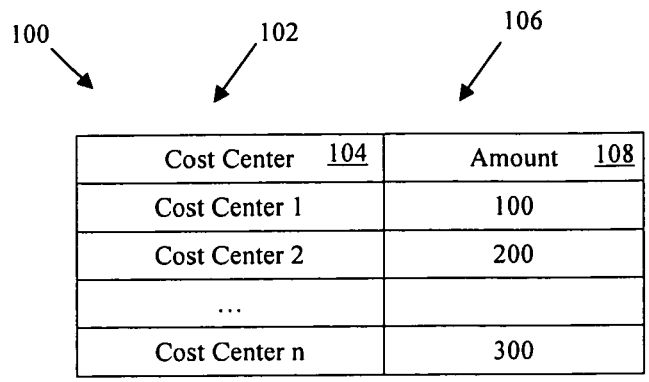
FIG. 1 is a prior art table.

To compare and contrast the basic table of FIG. 1 (prior art) with that of the expanded table of FIG. 2, it is noted that for every cost center (i.e., Cost Center 1 through Cost Center n) the total of the amounts in the expanded table is identical to the total of the amounts in the basic table. In other words, if all of the amounts for entries for Cost Center 1 of the expanded table were added together then the same total would result as was found for the amount of Cost Center 1 of the basic table.

By way of example, let it be assumed that two processes are to be executed, a first process will add 5 to Cost Center 1 and a second process will add 10 to Cost Center 1. A method that makes use of the basic table of FIG. 1 (prior art) might have the first process seize exclusive control of the first record and change the amount of the first record of Cost Center 1 from 100 to 105. The first process may then relinquish exclusive control of the first record, whereupon the second process, which may have been waiting of the first process to complete its task, would seize exclusive control and change the amount in the first record of Cost Center 1 from 105 to 115. Thus, the two changes on the same record must be made in a sequential manner, executed one after the other, and thus may cause a series bottleneck.

In contradistinction, in accordance with an embodiment of the invention, a method may be executed that allows multiple processes to access different records for the same cost center simultaneously, eliminating the series bottleneck associated with the prior described method. By way of example, using the expanded table of FIG. 2, let it be assumed that a first process may only update records with PROCESS ID=01 and a second process may only update records with PROCESS ID =02. Accordingly, the first process would update the record for Cost Center 1, PROCESS ID 01 from 70 to 75, while the second process would update the record for Cost Center 1, PROCESS ID 02 from 30 to 40. No other records would be affected and the updates may occur simultaneously or contemporaneously. Although every process has exclusive control of the record to be updated, no constraints will occur because different processes affect different records. Of course, more than two processes could update or otherwise access the table; the use of two processes in the preceding example was meant to be exemplary and not limiting.

Further, now assume that a new process, process n+1, has begun. The n+1th process may attempt to add a value of 15 to the amount field of Cost Center 1. The n+1th process may attempt to identify a set of records associated with PROCESS ID n+1, but, in the table as illustrated in FIG. 2, there is no record for Cost Center 1 and PROCESS ID n+1. Accordingly, the n+1th process may insert a new record in the table. That record may be associated exclusively to the combination of Cost Center 1 and PROCESS ID n+1. The new process may insert the new record by any mechanism known to those of skill in the art. The new record may initially have a value of 0 stored in a cell in it's amount field (i.e., in a cell in the new record's Amount field 210); subsequently the value of 15 may be added to the cell in the new record's amount field. Alternatively, the new record could be generated with the value of 15 already stored in the cell of its amount field. Accordingly, whenever a new process accesses the table for purposes of at least summing a value to the table, and an appropriate process identifier (PROCESS ID) for a given record (e.g., a given Cost Center) is not already in existence, a method in accordance with an embodiment herein may insert a new record into the table for the new combination of Cost Center and PROCESS ID (i.e., the new combination of record identification field known as "Cost Center" and PROCESS ID The expanded table 200 could be shared among any number of multiple processes. Each process may add as many records to the table as it may require. For reporting, the records that share identical first fields but whose PROCESS ID fields differ in value (e.g., records of rows 214 and 230) may then be merged and their values summed together. For example, records 220 and 221 in the third field 210 may be summed together because their associated records 216, 217, respectively, in the first field 202 are identical, while their associated records 218, 219, respectively, in the second field 206 differ.

Figure 3:
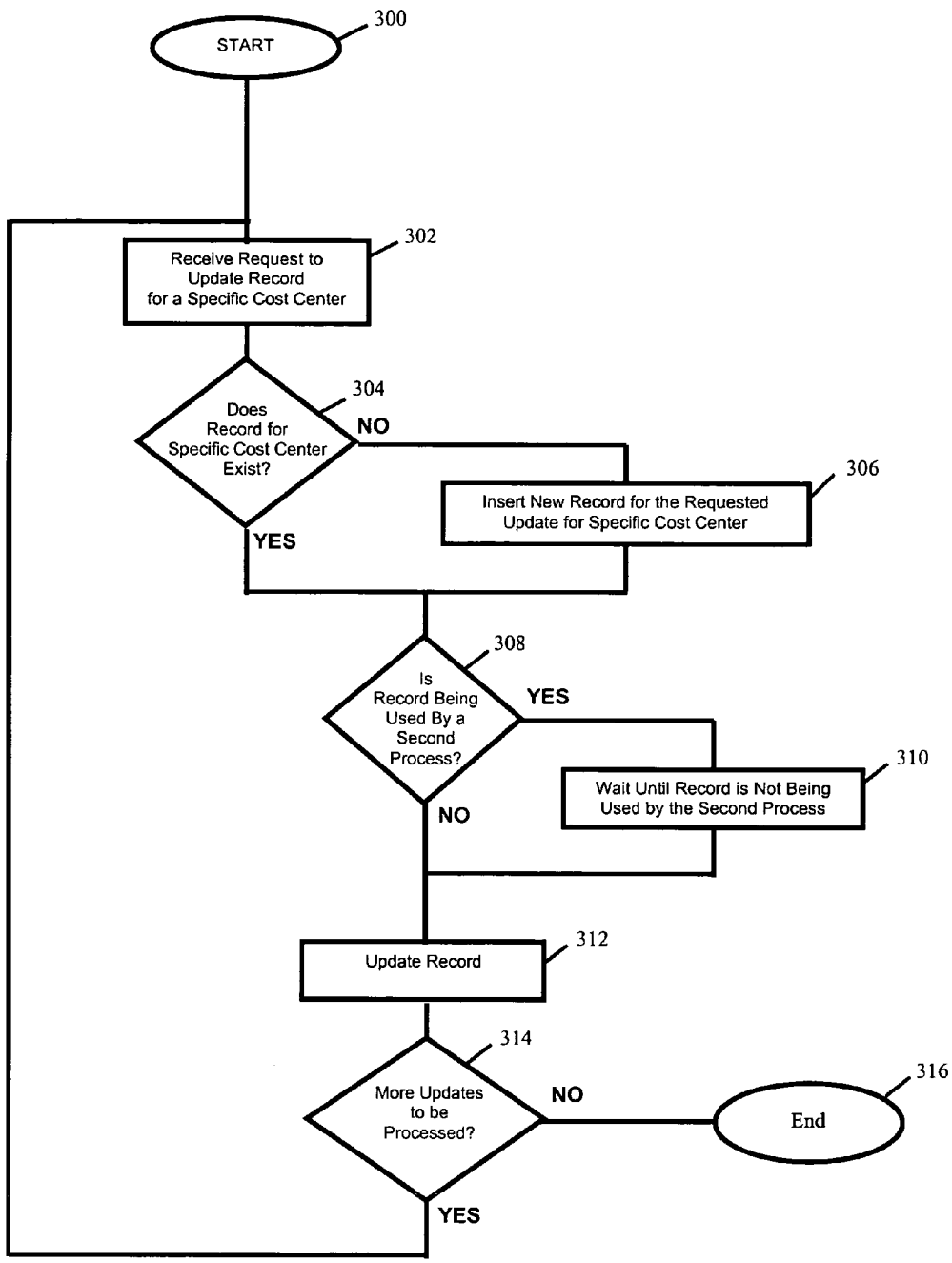
FIG. 3 is a block diagram of a prior art method to update records.

FIG. 3 is a block diagram of a prior art method to update records. The method may begin at 300. At 302, a request to update a record for a specific cost center may be received. At 304, if the record for the specific cost center exists, then the method may continue at 308. If the record for the specific cost center does not exist, then a new record for the requested update for the specific cost center may be inserted at 306. The method may continue at 308. At 308 at determination may be made as to whether the record is being used by a second process, different from the first process. If the second process is using the record, then at 310, the method may wait until the second process is not using the record. If the second process is not using the record, or when the wait at 310 has concluded, then at 312, the record may be updated. At 314, a determination is made as to whether any other records are to be updated, or, for example, whether the last record for this process has been processed. If there are records remaining, the method may return to 302, otherwise the method may end at 316.

Figure 4:
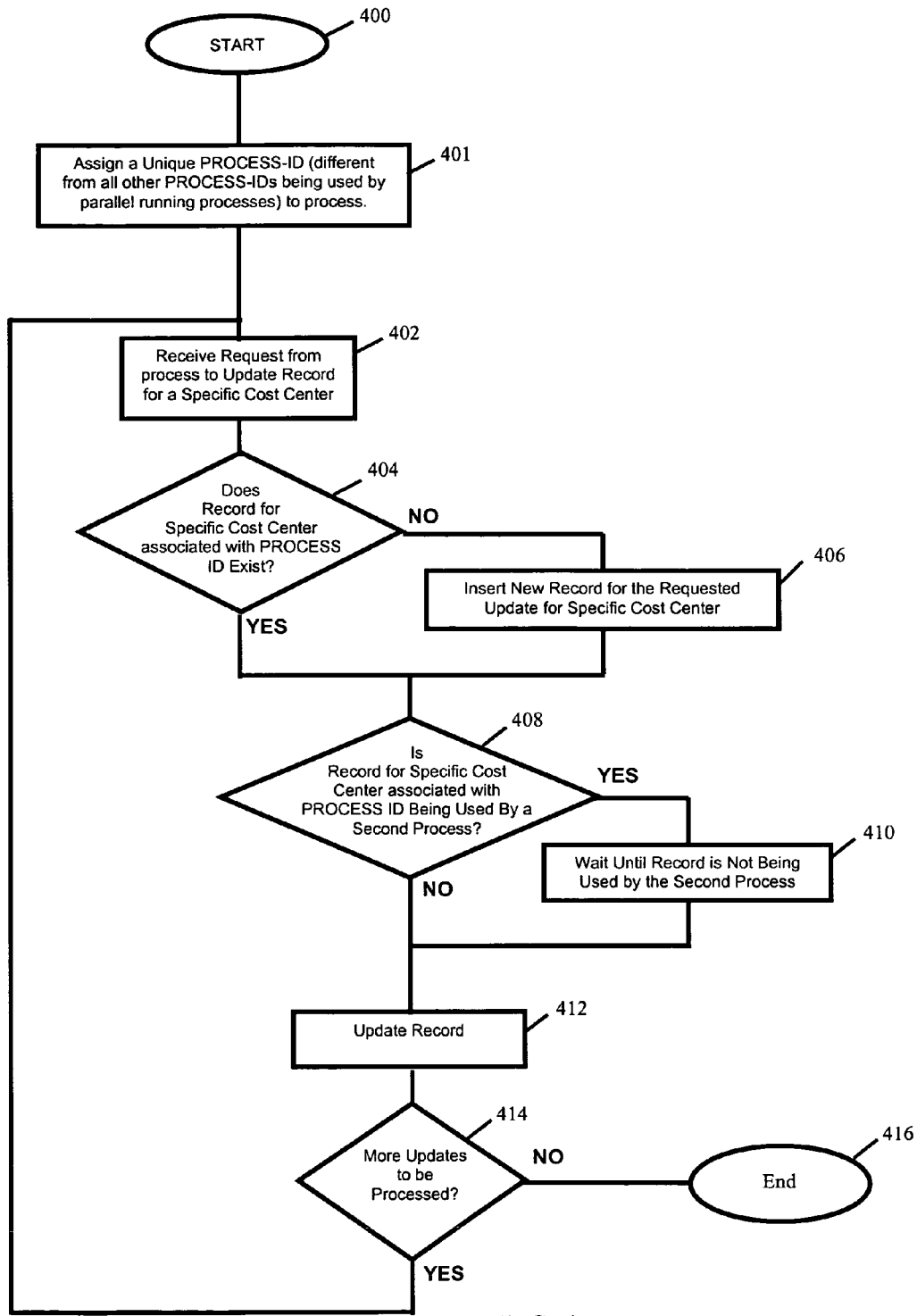
FIG. 4 is a block diagram of a method in accordance with an embodiment of the invention.

FIG. 4 is a block diagram of a method in accordance with an embodiment of the invention, which may be used with an expanded table, such as the table of FIG. 2. In addition to the changed design of the database table(s), it is preferable that processes running in parallel carry out their updates on sets of records specifically associated and reserved for use with individual ones of the processes that are running in parallel. If updates are not processed in this manner, then it is possible, as explained above, that a bottleneck may occur when two processes attempt to change the same record. The PROCESS ID field, as exemplified in the second column 206 of the table of FIG. 2, may be included in tables in accordance with an embodiment of the invention so that every process may operate on separate records. Using a field such as the PROCESS ID field 206, multiple processes may not update the same record. It is noted that each process may have a unique process identifier (e.g., a PROCESS ID) reserved for it. As used herein, the word "unique" means that no other parallel running processes will use the same identifier. In one embodiment, the unique identifier may be a numeric or alpha character or a combination thereof.

The method of FIG. 4 may begin at 400. At 401, a unique process identifier, different from all other process identifiers being used by parallel running processes, may be assigned to a process. At 402, a request to update a record for a specific cost center may be made by a first process. At 404, a determination is made as to whether the record for the specific cost center associated with the unique process identifier of the first process exists. If the record for the specific cost center associated with the unique process identifier of the first process exists, then the method may continue at 408. If the record for the specific cost center associated with the unique process identifier of the first process does not exist, then a new record for the requested update of the specific cost center associated with the unique process identifier of the first process may be inserted at 406. The method may continue at 408. At 408 at determination may be made as to whether the record for the specific cost center associated with the unique process identifier of the first process is being used by a second process, different from the first process. If the record for the specific cost center associated with the unique process identifier of the first process is being used by a second process, then at 410, the method may wait until the record for the specific cost center associated with the unique process identifier of the first process is not being used by the second process. If the record for the specific cost center associated with the unique process identifier of the first process is not being used by a second process, or when the wait at 410 has concluded, then at 412, the record for the specific cost center associated with the unique process identifier of the first process may be updated. At 414, a determination may be made as to whether any other records are to be updated, or, for example, whether the last record for this process has been processed. If there are records remaining, the method may return to 402, otherwise the method may end at 416.

It will be noted that the probability of a record being used by a second process, as evaluated at 308, FIG. 3 increases with the number of parallel running processes. Accordingly, the probability of serialization (i.e., the serial queuing of processes) and the associated additional wait time as realized at 310, FIG. 3, will likewise increase with the number of parallel running processes. In contradistinction, the probability of a record being used by a second process, as evaluated at 408, FIG. 4 is zero if no two parallel running processes use the same unique process identifier. Accordingly, the probability of serialization and the associated additional wait time as realized at 410, FIG. 4, will be zero regardless of the number of parallel running processes.

It is noted that a method to update values (e.g., amounts, quantities) that are assigned to an object (e.g., cost center, general ledger account, material) that allows parallel running processes to update the values of the same object(s) without hindering one another may include an assigning of a PROCESS ID to every running process taken from a predefined set of PROCESS IDs (e.g. 00, 01, . . . 99) in a way that no two processes running in parallel will use the same PROCESS ID. In one embodiment, processes that are finished may release their PROCESS ID. The PROCESS ID thus becomes available for another process that requires one. Those of skill in the art will know of methods in data processing which can ensure the required unique allocation of PROCESS Ids, accordingly, such methods are not described herein.

It is also noted that a method to update values that are assigned to an object that allows parallel running processes to update the values of the same object(s) without hindering one another may involve the use of a heretofore unknown structure of database records, where the values assigned to the objects are stored. The new structure may differ from the known structures that are technically designed to store all the relevant data (e.g., object key(s) and object value(s)) in so far, that a unique process identification field (e.g., PROCESS-ID) is added. This field may be used as a key field to distinguish records.

It is further noted that in an embodiment, any update or insert of records to the database table, that is executed by a process, will affect only records where the unique process identifier field includes the value assigned to the process (e.g., a first process may have a value of 00 assigned to it).

In accordance with one embodiment, if more than a foreseen number of PROCESS IDs are required at the same time (e.g., one-hundred-and-one PROCESS IDs are required, but the foreseen set is 00, 01, . . . , 99), the first PROCESS ID (here 00) may be taken for the one hundred and first process, accepting, that two or more processes now work with the same Process ID.

In accordance with an embodiment, any retrieval function (e.g., a function that may determine a total value assigned to a cost center, general ledger account, material, etc.) may read all records assigned to the object. All these records contain the same object key (e.g., identification of the cost center, general ledger account, material, etc.) but different values for the PROCESS IDs. The total value assigned to the object may be calculated as the sum of all records retrieved.

Figure 5:
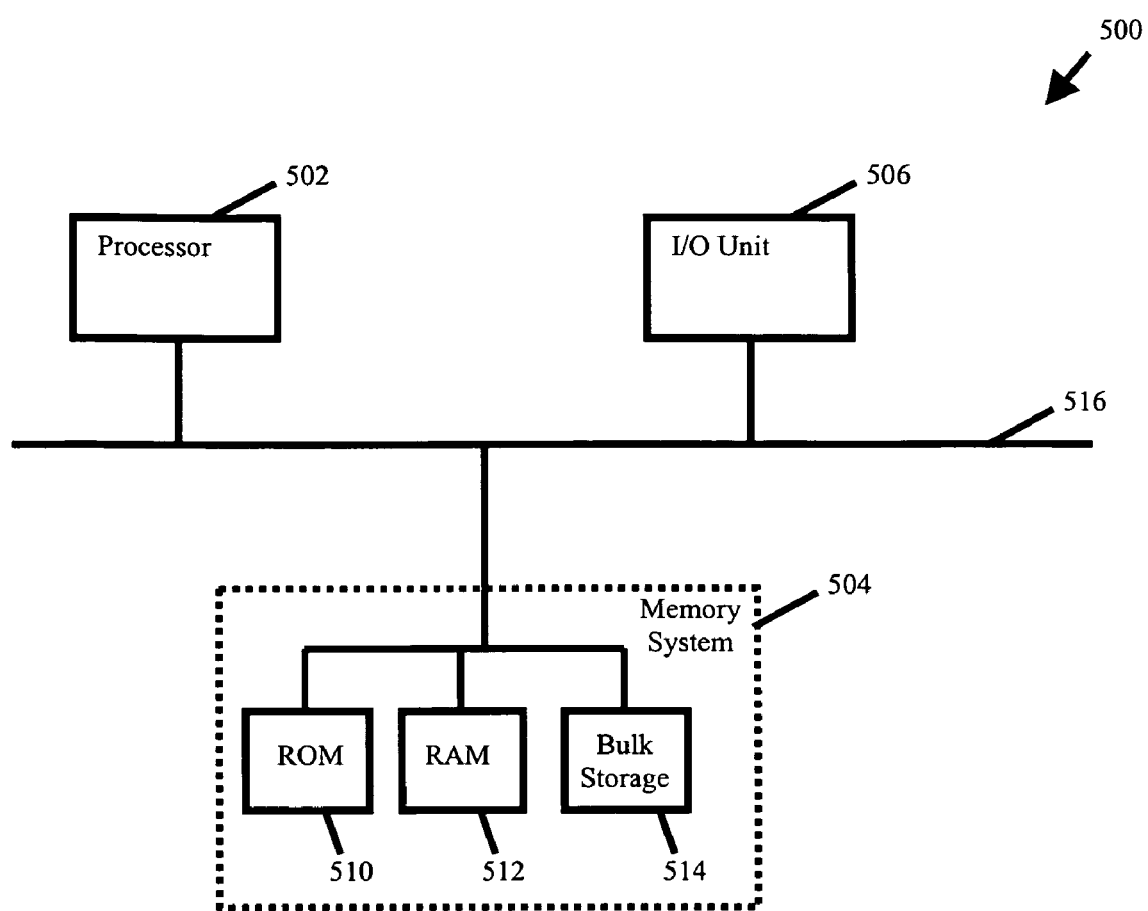
FIG. 5 is a block diagram of a system in accordance with an embodiment of the invention.

FIG. 5 is a system in accordance with an embodiment of the invention. It is noted that the functionality of the foregoing embodiments may be provided on various computer platforms executing program instructions. One such platform 500 is illustrated in the simplified block diagram of FIG. 5. There, the platform 500 is shown as being populated by a processor 502, a memory system 504, and an input/output (I/O) unit 506. The processor 502 may be any of a plurality of conventional processing systems, including microprocessors, digital signal processors and field programmable logic arrays. In some applications, it may be advantageous to provide multiple processors (not shown) in the platform 500. The processor(s) 502 execute program instructions stored in the memory system 504. The memory system 504 may include any combination of conventional memory circuits, including electrical, magnetic or optical memory systems. As shown in FIG. 5, the memory system may include read only memories 510, random access memories 512, and bulk storage 514. The memory system not only stores the program instructions representing the various methods described herein but also can store the data items on which these methods operate. The I/O unit 506 may permit communication with external devices (not shown). A communications bus 516 may couple all components and/or units or subunits of the platform 500.

In an embodiment, the values to be used in the PROCESS ID field for mass processes and the values to be used for individual processes may be pre-defined in the system, taking into account the following:

the higher the number of available PROCESS IDs, the more processes can work in parallel without hindering each other; and the higher the number of PROCESS IDs actually used, the higher the memory requirement and the higher the runtime for reports, which have to summarize the PROCESS IDs.

Measurement Results

A table with four fields plus a PROCESS ID and a summary field was created in an SAP system using a DB2 7.1.0 database. A test program generated 1,000 updates for each of five summary records. Each of the five summary records was thus changed 1,000 times, resulting in 5,000 updates per process.

The program was started simultaneously in two, three, and four parallel processes. In the first test sequence, the updates took place without different PROCESS IDs. In the second test sequence, they took place with different PROCESS IDs. The results are shown in Table A, below.

TABLE A

| Number of Parallel Processes | Duration in Seconds (Min.-Max.) with Same PROCESS ID | Duration in Seconds (Min.-Max.) with Different PROCESS ID |
| --- | --- | --- |
| 2 | 27.1-32.5 | 17.2-24.0 |
| 3 | 43.1-48.4 | 20.9-26.1 |
| 4 | 60.9-64.4 | 21.0-22.6 |

The measurement values indicate that processing times tend not to increase with additional number of processes when multiple PROCESS IDs are used. Processing times, however, do tend to increase with additional number of processes when the same PROCESS ID is used.

If these figures are extrapolated to an example with only four parallel processes in which 2,000,000 updates have to take place (for example, 400,000 documents, each with five posting items), 500,000 updates are allotted to each process, for which around 6,200 seconds are required if the PROCESS ID is the same and 2,200 seconds if the PROCESS IDs are different. The duration of the updates is thus reduced from around one hour and 43 minutes to 37 minutes.

Effect with Read Accesses

A differentiation between mass accesses and accesses to specific objects may be made (e.g., an object would be one specific cost center or one specific general ledger account). For example with a general ledger summary table, mass accesses (when all or a large proportion of entries are read) are required for preparing balance sheets. Accesses to specific objects are required, for example, if the overall status of an account needs to be displayed.

Typically, mass accesses are only required periodically (e.g., during closing operations) and do not cause performance problems because the number of summary records is considerably lower than the number of individual records from which the summaries are created.

Measurements described above were made for accesses to specific objects: records from five PROCESS IDs were read instead of a single record. The measurement results did not show any significant differences in the time taken to access the database. Reading the five records was never over 20% slower than reading one record.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer-implemented method, comprising:
assigning identifiers to a plurality of processes, wherein the identifiers are selected from a predefined set of identifiers, wherein no two processes running in parallel use the same identifier;
receiving a first request from a first process, having assigned thereto a first identifier, to update a data field of a record with a first key in a set of records stored in a database, each record comprising a key field for identifying the record and a sub-record for each process accessing the record, each sub-record comprising a process identifier and a sub-data field, wherein the value of the data field for the record is the sum of each of the sub-data fields of the record;
determining if the record with the first key has a sub-record for the first identifier in the database; and
when the record with the first key has a sub-record with the first identifier, then updating the sub-data field of the sub-record with the first identifier,
otherwise creating a sub-record for the first identifier and updating the sub-data field of the created sub-record field;
receiving a second request from a second process, having assigned thereto a second identifier, to update the data field of the record with the first key,
determining if the record with the first key has a sub-record for the second identifier in the database; and
when the record with the first key has a sub-record with the second identifier, then updating the sub-data field of the sub-record with the second identifier, wherein the first and second processes update the record without hindering one another,
otherwise creating a sub-record for the second identifier and updating the sub-data field of the created sub-record field.

2. The method of claim 1, wherein the first and second requests are contemporaneous.

3. The method of claim 1, wherein the process is one of an individual process and a mass process.

4. The method of claim 1, wherein after a process is complete, the process will release the identifier associated thereto, whereby the identifier becomes available for another process.

5. The method of claim 1, wherein the data field is a general ledger account.

6. A system comprising:
a processor;
a memory, the memory including a set of instructions to be executed by the processor, the instructions comprising instructions to:
assign identifiers to a plurality of processes, wherein the identifiers are selected from a predefined set of identifiers, wherein no two processes running in parallel use the same identifier;
receive a first request from a first process, having assigned thereto a first identifier, to update a data field of a record with a first key in a set of records stored in a database, each record comprising a key field for identifying the record and a sub-record for each process accessing the record, each sub-record comprising a process identifier and a sub-data field, wherein the value of the data field for the record is the sum of each of the sub-data fields of the record;
determine if the record with the first key has a sub-record for the first identifier in the database; and when the record with the first key has a sub-record with the first identifier, then update the sub-data field of the sub-record with the first identifier, otherwise create a sub-record for the first identifier and update the sub-data field of the created sub-record field;

receive a second request from a second process, having assigned thereto a second identifier, to update the data field of the record with the first key, determine if the record with the first key has a sub-record for the second identifier in the database; and when the record with the first key has a sub-record with the second identifier, then update the sub-data field of the sub-record with the second identifier, wherein the first and second processes update the record without hindering one another, otherwise create a sub-record for the second identifier and update the sub-data field of the created sub-record field.

7. A computer-readable storage medium having stored thereon a plurality of executable instructions that when executed by a processor cause the processor, the plurality of instructions comprising instructions to:

assign identifiers to a plurality of processes, wherein the identifiers are selected from a predefined set of identifiers, wherein no two processes running in parallel use the same identifier;

receive a first request from a first process, having assigned thereto a first identifier, to update a data field of a record with a first key in a set of records stored in a database, each record comprising a key field for identifying the record and a sub-record for each process accessing the record, each sub-record comprising a process identifier and a sub-data field, wherein the value of the data field for the record is the sum of each of the sub-data fields of the record;

determine if the record with the first key has a sub-record for the first identifier in the database; and when the record with the first key has a sub-record with the first identifier, then update the sub-data field of the sub-record with the first identifier, otherwise creating a sub-record for the first identifier and update the sub-data field of the created sub-record field;

receive a second request from a second process, having assigned thereto a second identifier, to update the data field of the record with the first key, determine if the record with the first key has a sub-record for the second identifier in the database; and when the record with the first key has a sub-record with the second identifier, then update the sub-data field of the sub-record with the second identifier, wherein the first and second processes update the record without hindering one another, otherwise create a sub-record for the second identifier and update the sub-data field of the created sub-record field.

* * * * *